United States Patent
Abarca et al.

[19]

[11] Patent Number: 6,164,670
[45] Date of Patent: *Dec. 26, 2000

[54] TRACKED CYCLE

[75] Inventors: Daniel Abarca, deceased, late of Simi Valley; Regina I. Urewicz, executrix, Vacaville, both of Calif.

[73] Assignee: Bryan D. Abarca, Grand Rapids, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/889,431

[22] Filed: Jul. 8, 1997

(Under 37 CFR 1.47)

[51] Int. Cl.$^7$ ...................................................... B62B 15/00
[52] U.S. Cl. ........................................ 280/12.14; 180/190
[58] Field of Search .................................. 280/845, 12.1, 280/12.13, 12.14, 28.5, 13, 14; 180/190, 193; 192/217.2

[56] References Cited

U.S. PATENT DOCUMENTS

| | | | |
|---|---|---|---|
| 526,556 | 9/1894 | Bolton | 280/12.1 |
| 541,426 | 6/1895 | Detreux | 280/28.5 |
| 592,231 | 10/1897 | Beekman | 192/217.2 |
| 654,291 | 7/1900 | Stith | 280/28.5 |
| 1,318,166 | 10/1919 | Matheus | 280/12.1 |
| 1,454,707 | 5/1923 | Davis | 192/217.2 |
| 1,497,729 | 6/1924 | McGrath | 192/217.2 |
| 1,504,210 | 8/1924 | Bush | 192/217.2 |
| 2,489,964 | 11/1949 | Hood | 192/217.2 |
| 2,764,270 | 9/1956 | Goul | 192/217.2 |
| 3,336,994 | 8/1967 | Pederson | 280/13 |
| 3,915,468 | 10/1975 | Hoareau | 280/12.1 |
| 4,768,794 | 9/1988 | Bibollet | 180/190 |
| 5,027,930 | 7/1991 | Reed | 192/217.2 |

FOREIGN PATENT DOCUMENTS 2556303  6/1985  France .

OTHER PUBLICATIONS

Cuerdon, Don, "The Ice Bike Cometh", Bicycling Magazine, pp. 118, 120, Feb. 1988.

*Primary Examiner*—J. J. Swann
*Assistant Examiner*—Frank Vanaman
*Attorney, Agent, or Firm*—Price, Heneveld, Cooper, DeWitt & Litton

[57] ABSTRACT

A tracked cycle including a frame assembly defining a front end and a rear end is provided for receiving a drive assembly mounted to the frame assembly. The drive assembly includes a drive gear assembly mounted to the frame assembly, a first idler wheel mounted to the rear end of the frame assembly distant from the drive assembly, and a second idler wheel intermediate the drive gear assembly and the first idler wheel and pivotally interconnected to the frame assembly to a shock absorber assembly depending from the frame assembly. A continuous track is provided extending around the drive gear assembly and the first and second idler wheels to generally define a triangle such that one side of the triangle defined by the continuous track extending between the first and second idler wheels is in contact with the ground, and a second side of the triangle defined by a portion of the continuous track extending between the drive gear assembly and the second idler wheel is inclined toward the front end of the frame assembly. The tracked cycle also includes a steering post extending to a tube attached to the front end of the frame assembly, a handle bar assembly attached to the upper end of the steering post, and a ski assembly attached to the lower end of the steering post such that movement of the handle bar assembly moves the ski assembly about a longitudinal axis of the steering post. The tracked cycle is also provided with a manual drive system attached to the drive gear assembly. In the alternative, the manual drive may be replaced with an internal combustion engine coupled to the drive gear assembly in a conventional manner.

7 Claims, 5 Drawing Sheets

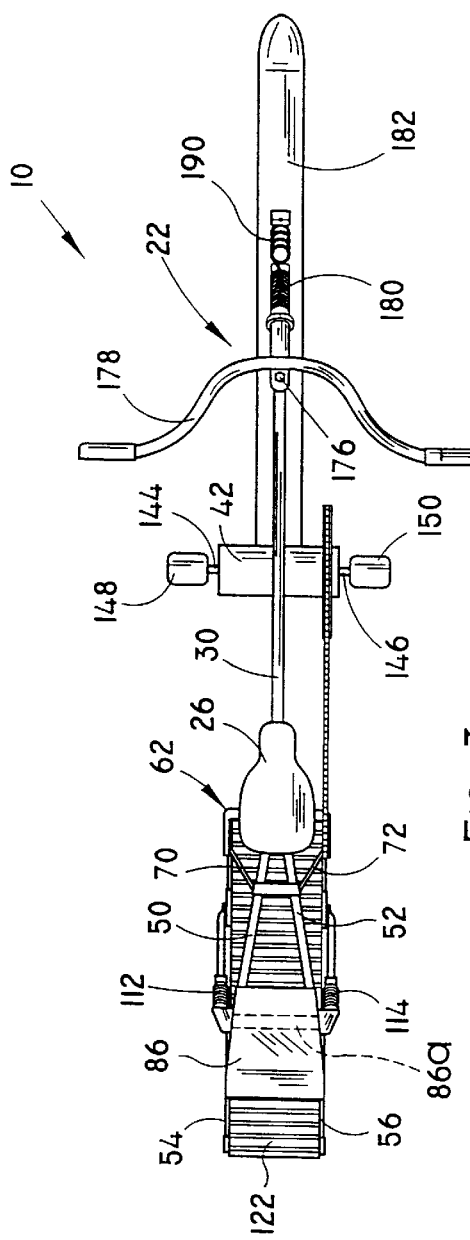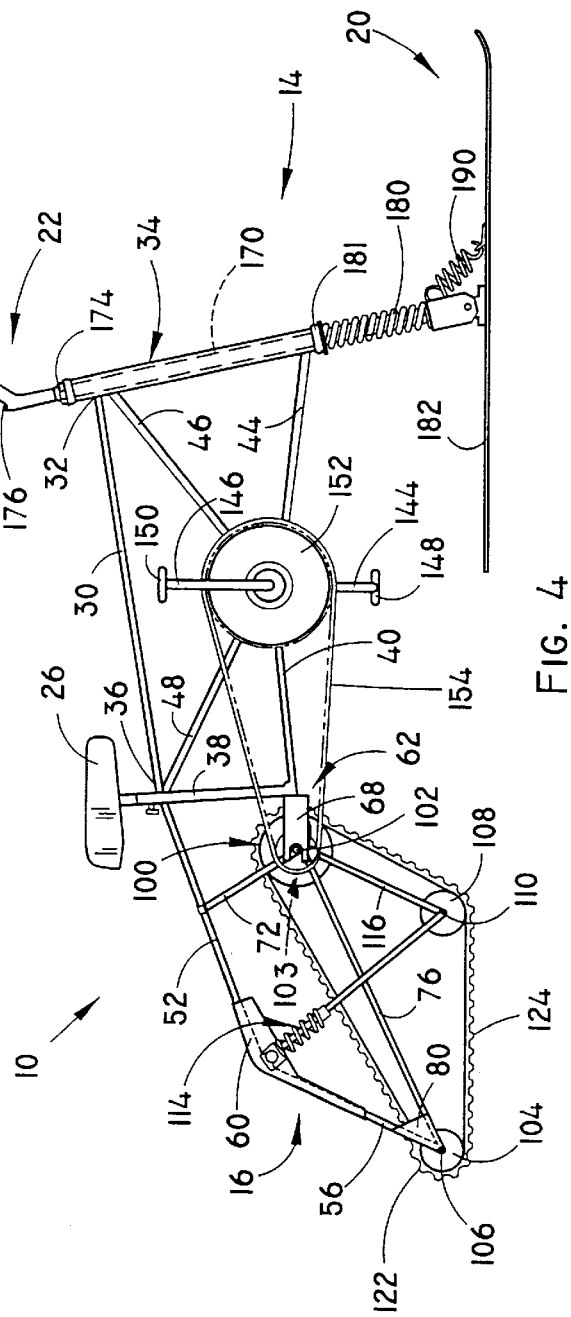

TRACKED CYCLE

BACKGROUND OF THE INVENTION

1. Field of the Invention

This invention relates generally to tracked vehicles, and particularly to a cycle having a rear track for providing the driving force and a front ski for steering the cycle.

2. Discussion of the Prior Art

Track-driven cycles have been designed based upon the standard bicycle frame and using many of the same components. For example, French Patent Publication 2,556,303, published in 1985, discloses the adaptation of a conventional bicycle frame to a track wherein the front fork, instead of receiving a wheel, is coupled to an A-frame attached to a ski. In another example, illustrated in U.S. Pat. No. 3,915,468, a bicycle-type frame is mounted to a track assembly. In 1900, U.S. Pat. No. 654,291 issued which also disclosed a bicycle frame having front and rear tracks.

Each of the foregoing tracked cycles suffer from disadvantages which render them impractical or unworkable. The French design is simply an adaptation of a road bicycle frame which is inherently weak, particularly in the front fork design. The lower end of the front fork, coupled to the top of the ski A-frame does not have sufficient rigidity to withstand torsional stresses. Moreover, the track assembly does not provide sufficient rise in the leading edge to climb above snow or mud deeper than the height of the track. With respect to the device disclosed in the '468 patent, a conventional bicycle front fork is also used, which does not accommodate torsional stresses in the horizontal plane produced by the ski. Furthermore, the track assembly is fairly complicated and bulky, which increases the weight of the vehicle making it difficult to power manually. Additionally, the low profile of the frame and the location of the crank shaft and pedals results in the user's feet often in the snow or mud, making pedaling difficult. The device disclosed in the '291 patent publication also suffers from many of the same aforementioned problems, but also employs an extremely complicated tracking system requiring many moving components. This latter system is extremely heavy, costly to manufacture, and inordinately difficult to power, particularly when debris encrusts the race about which the track runs.

SUMMARY OF THE INVENTION

In general, a tracked vehicle is provided having a general bicycle configuration and intended to operate over snow or other soft terrain. In one embodiment of the invention, the cycle includes a frame assembly defining a front end and a rear end, a triangular continuous drive track mounted to said frame assembly, a steering post extending through a tube attached to the front of the frame assembly, a handle bar attached to an upper end of the steering post, a ski assembly attached to a lower end of the steering post, and a means mounted on the frame assembly for driving the triangular continuous track so as to move the cycle over the ground.

The triangular, continuous track includes a drive gear assembly mounted to the frame assembly, a first idler wheel mounted to the rear of the frame assembly distant from the drive gear assembly, and a second idler wheel intermediate the drive gear assembly and the first idler wheel and pivotally interconnected to the frame assembly by a shock absorber assembly depending from the frame assembly such that one side of the triangle defined by the continuous track extending between the first and second idler wheels is in contact with the ground and another side of the triangle defined by the continuous track extending between the drive gear assembly and the second idler wheel is inclined toward the front of the frame.

The embodiment of the invention described above may further include a crank shaft pivotally attached to a lower end of the frame assembly, a first sprocket attached to the crank shaft, a second sprocket attached to the driver gear, and pedals and crank arms attached to the crank shaft. In the alternative, an internal combustion engine may replace the crank shaft, crank arms, and pedals.

Another form of the invention is embodied by a snow bike comprising a frame having front and back ends, a generally triangular-shaped track assembly attached to the back of the frame, the track assembly including a drive gear assembly mounted to a forward portion of the rear end, a first wheel mounted to the rear end of the frame, a second wheel intermediate the drive gear assembly and the first wheel, and a continuous traction belt extending around the drive gear assembly and the first and second wheels. A pair of struts pivotally interconnect the second wheel to the rear end for forcing a portion of the traction belt extending between the first and second wheels into contact with the ground and keeping tension of the continuous traction belt. A steerable ski assembly is pivotally interconnected to a handle bar assembly at the front end of the frame. Means are provided on the frame assembly for driving the continuous traction belt about the drive gear and the first and second wheels to drive the snow bike over the ground.

In another embodiment of the invention described above, the frame of the snow bike is forked at the rear end to support either one or two generally triangular-shaped track assembly therebetween. Furthermore, the snow bike includes either an internal combustion engine or a pedal-powered crank shaft connected to the drive gear.

The advantages provided by the snow bike embodying the invention include improved traction and handling of the bike on snow or other soft terrain. The frame locates the source of power at a high center of gravity so that it is above the snow and reduces drag. This is achieved in most part by the inclined portion of the track ahead of the two wheels. The front end offers improved steering because the ski tip is biased upwardly so the ski planes on the snow or soft terrain. Moreover, the traction portion of the bike is improved over prior devices in that it is less complicated, thus less costly to manufacture and has improved performance. The overall track configuration improves traction, even at low RPMs. The traction system also includes a suspension system which improves traction by keeping the track engaged with the ground.

A better understanding of the invention and the advantages provided thereby may be obtained by reference to the specification and the attached drawing figures.

BRIEF DESCRIPTION OF THE DRAWING FIGURES

FIG. 3 is a plan view of the tracked cycle shown in FIG. 2;

FIG. 4 is a side elevation view opposite that shown in FIG. 2;

DETAILED DESCRIPTION OF THE PREFERRED EMBODIMENTS

Figure 1:
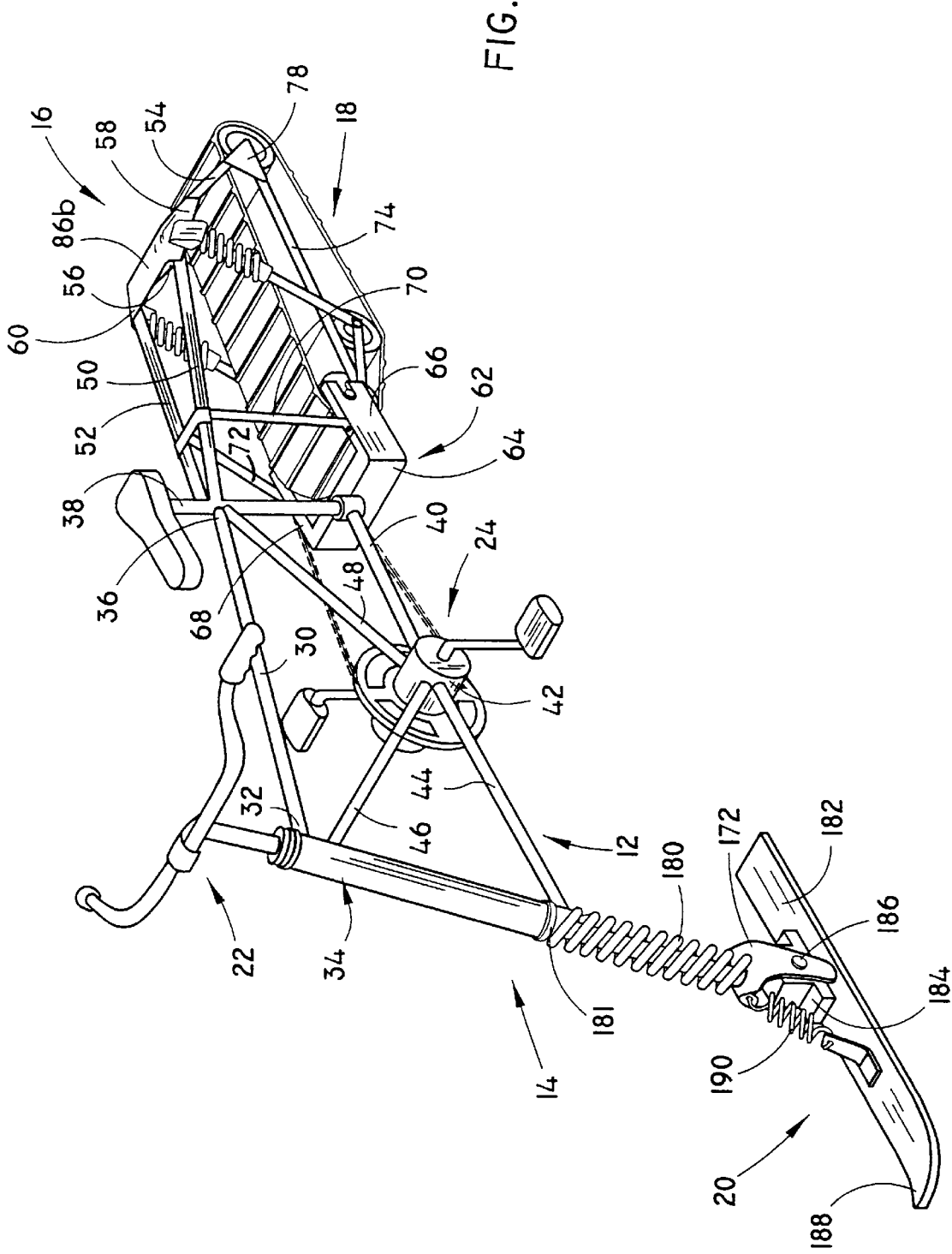
FIG. 1 is a perspective view of a tracked cycle embodying the invention.

Referring to FIGS. 1–4, one embodiment of a tracked cycle 10 is shown which is intended primarily for use on snow or other soft terrain. Generally, the tracked cycle or bike (hereafter "cycle") includes a frame 12 having a front end 14 and a rear, back, or tail end 16. A track assembly 18 is mounted to rear 16 of frame 12 to provide traction for cycle 10 over the snow or other terrain. Mounted to front end 14 of the frame is a steerable ski assembly, generally identified by reference numeral 20, and controlled by the operator through a handlebar assembly, generally identified by numeral 22. Also mounted to frame 12 is a drive assembly 24 connected to track assembly 18 for providing power to the track assembly. Drive assembly 24 may include a manually powered arrangement, an internal combustion engine, or an electric motor, as will be described in greater detail below.

Frame 12 provides a foundation upon which all of the components of cycle 10 are attached and upon which the operator rides. Frame 12 includes an upper tube 30 which extends generally the length of cycle 10, having one end 32 connected to a front tube or steering post 34 and an opposite end 36 terminating in a seat post 38. Attached to a lower end of seat post 38 is one end of a lower post 40, the opposite end of which terminates in a hub 42. Hub 42, in turn, is interconnected to front tube 34 by a pair of bracing posts 44, 46. Bracing post 44 extends from hub 42 to a lower portion of front tube 34, while brace 46 interconnects hub 42 to an upper portion of front tube 34 proximate upper tube 30. A third bracing post 48 may optionally be provided to interconnect hub 42 to upper tube 30 at a point proximate end 36.

Back 16 of frame 12 may have a number of configurations and defines the primary structure for retaining the generally triangular-shaped track or drive assembly 24. In one embodiment, back 16 of frame 12 includes two rear tubes 50, 52 each interconnected at one end to seat tube 38. Rear tubes 50, 52 are angled with respect to each other as they extend backwards, defining an A-frame structure. Attached to the opposite ends of rear tubes 50, 52 are the ends of back or tail upright members 54, 56. Upright members 54, 56 extend downwardly and backward from rear tubes 50, 52 at an angle greater than 90 degrees, preferably less than 180 degrees, and most preferably about 120 degrees, with respect to A-frame members 50, 52, as shown by the arc α. Brackets or sheet metal plates, such as 58, 60, interconnect back upright members 54, 56 to A-frame members 50, 52 to provide additional strength as well as to provide a coupling point for additional components, as will be described below.

Extending generally horizontally from a point near the bottom of seat tube 38 at the intersection with bottom or lower tube 40 is a generally U-shaped bracket 62 wherein the bottom member 64, interconnecting the two arms 66, 68, is rigidly attached to seat post 38 and lower tube 40 in a manner such that the open end of bracket 62 faces the rear of the frame. The free or opposite ends of the respective arms 66 and 68 are interconnected to A-frame members 50, 52 by angled bracing tubes 70, 72, respectively. The ends of arms 66, 68 are also interconnected to the lower or bottom ends of rear upright members 54, 56 by respective track tubes 74, 76. The coupling of the track tubes 74, 76 to the bottoms of rear upright members 54, 56 are each reinforced by sheet metal plates or brackets 78, 80.

According to the structure described above, frame 12 includes a left and right rear frame assembly 82, 84 such that when viewed from the back of the frame, the left-hand portion or fork 82 of frame 12 is defined by rear tube 50, back upright 54, plate 58, bottom member 64, bracing tube 70, track tube 74, and plate 78. The right side 84 or fork of frame 12 as defined by rear tube 52, back upright 56, plate 60, arm 68, bracing tube 72, track tube 76, and plate 80. The left- and right-hand portions 82, 84 of the rear frame are interconnected at several locations in order to produce a rigid assembly for housing the drive assembly described in detail below. At the forward portion of the rear frame, the two portions 82, 84 are interconnected by U-shaped bracket 62 at the lower end and by seat post 38 at the upper end. A cross-member 86 extends between and interconnects the two assemblies 82, 84 at the intersection of rear tubes 50, 52 with the rear upright member 54, 56. Cross-member 86 may be a heavy gauge, sheet metal plate which is integral with brackets/plates 58, 60 or it may be a tubular member. In a preferred embodiment, a single tubular member 86a (FIG. 3) spans the distance between the two assemblies. The tubular member is overlain and concealed by at least one plate 86b, and preferably two plates, rigidly interconnecting the tubular members 50, 52, 54, 56 and brackets 58, 60. A second or lower cross-member 88 is provided, interconnecting the lower ends of rear upright members 54, 56 to provide strength between the left- and right-hand portions. In a preferred embodiment, cross-member 88 is a heavy gauge, metal bar or sheet of metal located proximate plates 78, 80. In an alternative embodiment, cross-member 88 may extend the entire length and interconnect rear upright members 54, 56.

All of the tubular members comprising frame 12 are preferably made from alloy metals, such as 1031 aluminum alloy or other lightweight alloy, which is easily welded together. The stock forming the U-shaped bracket 62 and the reinforcing plates 58, 60, 78, 80, and 86 may also be formed from the same type of alloy. Other materials may also be used, such as carbon or graphite tubes, interconnected together by specially formed sleeves or joints. Because the cycle is intended to traverse soft terrains, weight is a factor which is why it is preferred to use lightweight components.

Attached to the rear portion of frame 12 is a generally triangular track or drive assembly 18. Drive assembly 18 includes drive wheel assembly 100 pivotally mounted via an axle 102 extending concentrically therethrough to slots 103 formed in the ends of arms 66, 68. Drive wheel assembly 100 is thus configured to rotate about an axis defined by axle 102 supported at opposite ends by arms 66, 68 of bracket 62. Also mounted in pivotal relation on the rear portion of frame 12 is second wheel 104 pivotally coupled by an axle 106 to plates 78, 80 interconnecting the rear upright members 54, 56 to track tubes 74, 76. A third wheel 108 is generally located intermediate drive wheel assembly 100 and wheel 104 and is spaced from track tubes 74, 76 by a predetermined distance such that the pivot points of the three wheels define three points of a triangle. Wheel 108 includes an axle 110 which is pivotally coupled at each end to a respective resilient strut or shock absorber assembly 112, 114. The opposite end of each strut or shock absorber is coupled to a flange or bracket extending from reinforcing plates 58, 60.

The ends of axle 110 are also interconnected to arms 66, 68 of U-shaped bracket 62 by a swivel arm assembly 116. Swivel arm assembly 116 is preferably a rigid frame which maintains the location of wheel 108 in swinging relationship with respect to drive wheel assembly 100. A fourth wheel, not shown, may also be provided which is connected by a moving arm, but is located above wheel 108 and track tubes 74, 76. The relationship between wheel 108 and struts 112, 114 is such that as wheel 108 moves upward, so does the wheel above tubes 74, 76. As struts 112, 114 force wheel 108 down, so moves the upper wheel. The shocks/struts 112, 114 are preferably conventional products and include a gas cartridge disposed with a coil spring. The coil spring is a compressive spring and provides a suspension system to wheels 108 while the gas cartridge dampens the resilient forces exerted by the spring wheels 104, 108. Although not specifically mentioned, wheels 104 and 108 act as idler wheels.

Mounted about drive wheel assembly 100, and each of the wheels 104, 108 is a drive belt 122 having a width substantially equal to those of wheels 100, 104, and 108. Belt 122 preferably has transverse treads or ridges 124 transversely extending therefrom on an exterior side to provide traction. The inner surface may include indentations or perforations at regular intervals to coincide and register with corresponding cogs extending from the exterior of the drive wheel assembly 100. Track or drive belt 122 is so arranged about the wheels such that the portion extending between wheels 104 and 108 engages the terrain and is for the most part horizontal, and the portion between wheel assembly 100 and wheel 108 is inclined upward from wheel 108 toward the front of frame 12. The third leg of belt 122 extends downward from drive wheel assembly 100 toward wheel 104 generally parallel to track tubes 74, 76.

Figure 5:
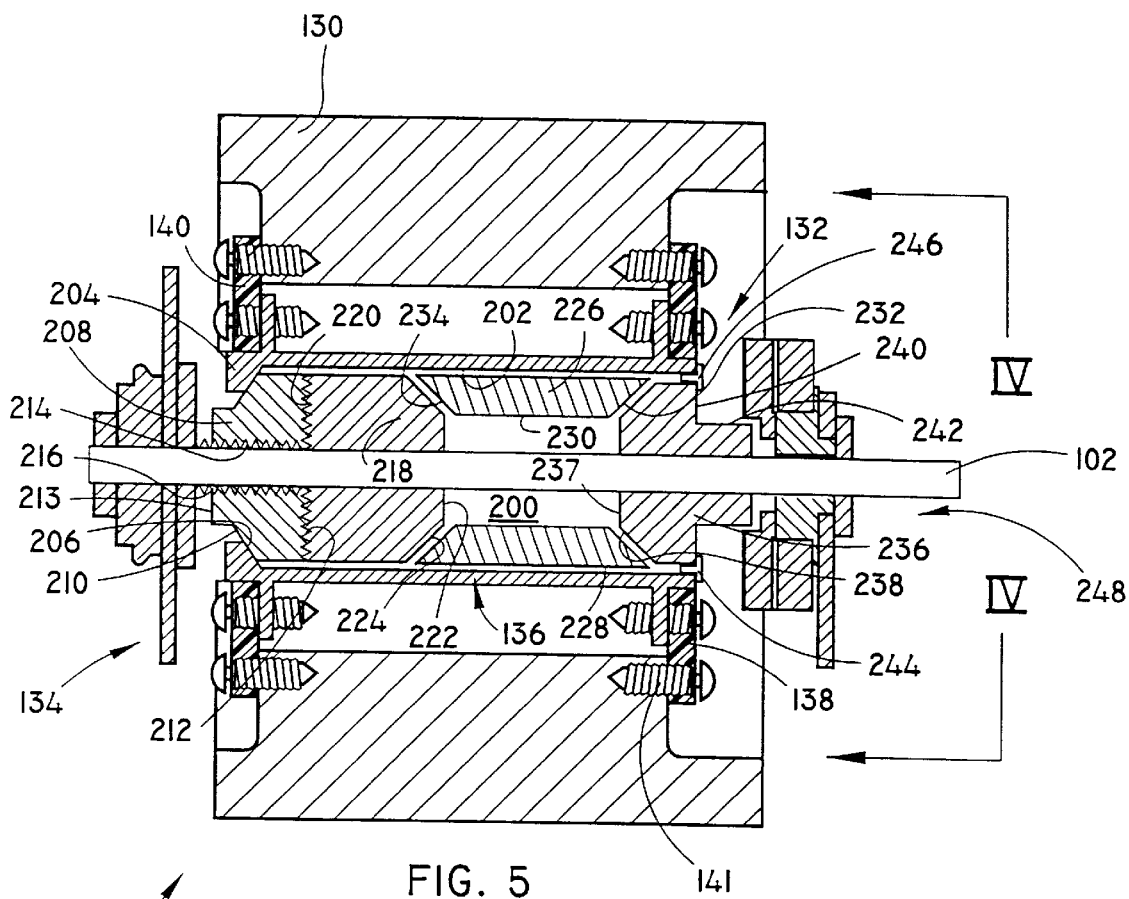
FIG. 5 is a fragmentary section view of the drive assembly.
Figure 6:
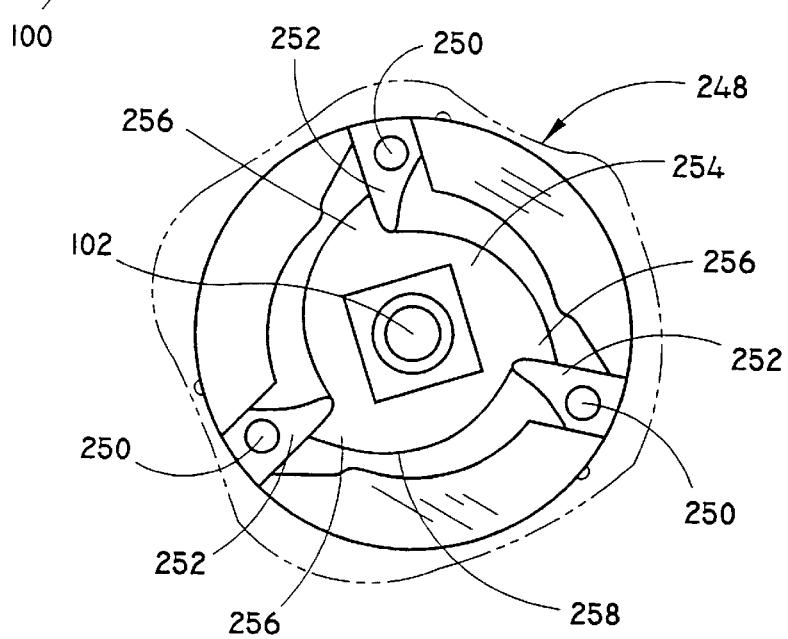
FIG. 6 is a fragmentary side elevation view of the clutch assembly shown in FIG. 5.
Figure 7:
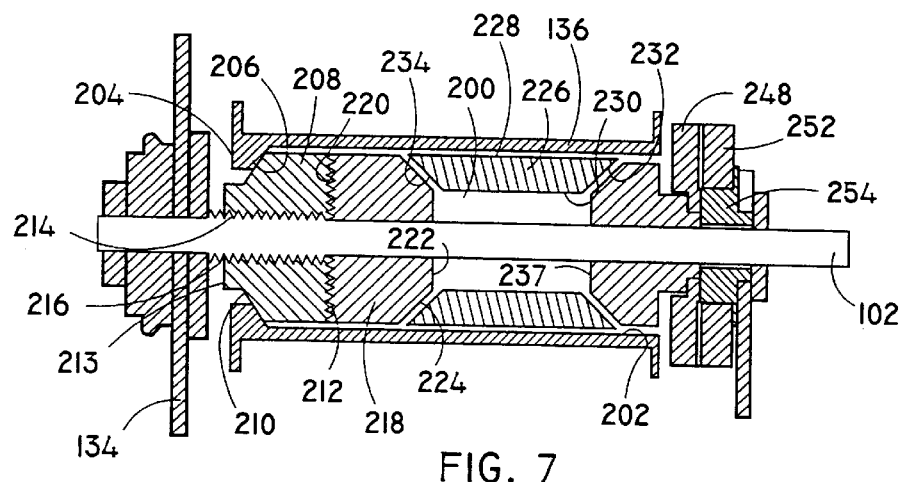
FIG. 7 is a fragmentary section view of the clutch assembly in a first position.
Figure 8:
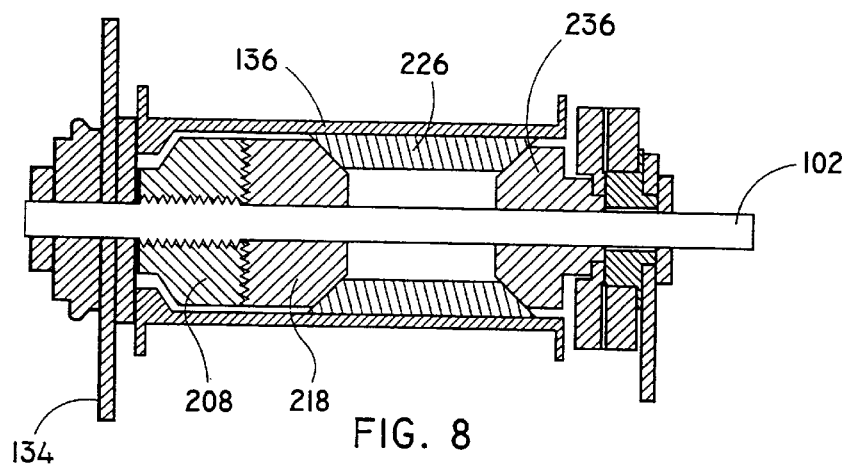
FIG. 8 is a fragmentary section view of the clutch assembly in a second position.

As shown in FIG. 5, drive gear assembly 100 includes an outer drive pulley 130 concentrically retaining a clutch assembly 132 which, in turn, is pivotally mounted on axle 102. At one end of clutch assembly 132, a drive gear 134 is concentrically mounted thereto along axle 102. Drive gear 134 is preferably a sprocket and may be of various sizes, depending upon the gear ratio desired. In a preferred embodiment, sprocket 134 has between 12 and 36 teeth, preferably between 12 and 20, and most preferably about 15. Sprocket or drive gear 134 is preferably attached to a hub 136 free to rotate about shaft 102. Attached to opposite ends of hub 136 and concentric therewith are adapter plates 138, 140 fixed with respect to hub 136 by fasteners 141. The outer periphery of adaptor plates 138, 140 are attached respectively to opposite ends of drive pulley 130. Rotation of drive gear or sprocket 134 in one direction results in a complimentary rotation of the adaptor plates 138, 140 and drive pulley 130. With hub 136, adaptor plates 138, 140, and drive pulley 130 in motion, rotation of sprocket 134 could stop without hindering the rotation of hub 136 and its associated components. Hub 136 also includes a coaster brake assembly described below such that when sprocket 134 is rotated in a second direction, brake pads within hub 136 extend to retard the rotation of hub 136, plates 138, 140, and drive pulley 130 to slow the vehicle down or stop the vehicle entirely.

According to one embodiment of tracked cycle 10 embodying the invention (FIGS. 1–4), a conventional manual crank assembly 142 may be pivotally mounted in hub 42 on lower tube 40 with crank arms 144, 146 extending from opposite ends. Attached to the ends of the crank arms 144, 146 may be pedals 148, 150, respectively. Also attached to crank arm 146 is a crank sprocket 152 larger in diameter than sprocket 134 and having between 20 and 80 teeth, preferably between 30 and 70, and most preferably about 40 to 60 teeth. Encircling and interconnecting crank sprocket 152 and drive sprocket 134 is a chain loop 154 substantially similar to those used on bicycles and motorcycles. Upon manual rotation of crank assembly 142 by forces applied to the ends of crank arms 144, 146, chain 154 extending around crank sprocket 152 rotates track 122.

The front of tracked cycle 10 is supported and direction control is provided by the ski assembly 20 and handle bar assembly 22. Front tube 34 concentrically receives therein tubular shaft 170 having a lower end terminating in a yoke 172. Shaft 170 extends the length of front tube 34 where the upper end receives a nut 174 at the top of the front tube to prevent shaft 170 from falling out of front tube 34. Bearings (not shown) are provided at the top and bottom of shaft 170 such that shaft 170 rotates about its longitudinal axis within tube 34. Nut 174 has an axial opening to receive a clamping lower portion of a conventional handle bar "goose neck" 176. The lower portion of the goose neck is also received within shaft 170. As is well-known, tightening of the bolt extending through the goose neck causes a wedge at the bottom to expand within tube 170 and form a rigid coupling therewith. Conventional handle bars 178 are fixed in place by the top clamp of goose neck 176. Received about the lower portion of tube 170 is a coil spring 180 compressed between yoke 172 and a flange 181 at the lower end of front tube 34 to provide suspension to the front of frame 12. A ski 182 is pivotally coupled by a block 184 and pin 186 extending through yoke 172. The ski 182 includes an upwardly bent tip 188 so that the ski tends to ride upward on the snow. A tension spring 190 assists, interconnecting a forward portion of ski 182 to yoke 172.

Referring to FIGS. 5–8, details on the clutch assembly 132 in hub 136 will now be provided. Hub 136 retains clutch assembly 132 in a substantially cylindrical housing having a concentric cylindrical inner cavity 200 defined by an inner cylindrical wall 202 extending substantially the length of the hub 136. The cylindrical wall 202 tapers inwardly at one end 204 to define a frusto-conical inner wall 206 before obtaining a constant diameter at the end 204 of the hub. Concentric with and extending through inner cavity 200 is axle 102 which, together with hub 136, supports the remaining components.

Disposed entirely within cavity 200 and concentric about shaft 102 is a jaw clutch 208 having a diameter slightly less than cylindrical wall 202, and includes an inwardly tapered surface 210 disposed at an angle which corresponds substantially with that of tapered wall 206, and located adjacent thereto such that tapered wall 206 and surface 210 may be moved into frictional engagement with each other. The opposite end 212 of jaw clutch 208 preferably has a textured or patterned surface, such as splines or crenulations, for reasons provided below. Extending through jaw clutch 208 between the ends is a passage 214. Passage 214 concentrically receives a quad-thread internal shaft 216 which, in turn, is received along shaft 102. One end of quad-thread internal shaft 216 terminates proximate surface 212 of jaw clutch 208, while the opposite end extends out through end 204 of hub 136 where it receives sprocket 134. Adjacent jaw clutch 208 and configured to mate against end 212 is a mating jaw member 218. Jaw member 218 is also received along shaft 102 and has an outside diameter slightly less than inner cylindrical wall 202. One end 220 includes a textured or patterned surface configured to mate in locking engagement with surface or end 212. An opposite end 222 of mating jaw member 218 includes an inwardly tapering surface 224 to define a frustrum when viewed in cross section. Located within cavity 200 and defining ring-like structure are three to five brake segments 226, each of which has an outer surface 228 engagable with the inner cylindrical wall 202, and an inner wall 230 having a width less than that of outer wall 228, and by inclined or sloping opposing sidewalls 232, 234. The degree of slope of sidewalls 232, 234 is preferably complimentary to that of the tapered surface 212 such that they may engage each other in sliding relationship, or wedge with respect to the other. Adjacent the opposite side of arcuate brake segments 226 is a frusto-conical member 236 concentrically received within hub cavity 200 along shaft 102. Interior or frusto-conical end 237 of member 236 includes a surface 238 which tapers inwardly at an angle complimentary to sloping surface 232. The opposite end 240 of member 236 transitions rapidly to a generally constant diameter cylindrical member 242 which extends outwardly from the end 244 of hub 136. It is desirable to locate roller bearings or needle bearings about the inner circumference of the passage extending through the quad-thread internal shaft as well as the axial passage of the fixed frusto-conical member so that rotation of hub 136 and the internal components remains generally friction free with axle 102. Moreover, the outside diameter of the end 213 of jaw clutch member 208 is slightly smaller than the interior diameter of the end opening to prevent debris entering therein. The opposite end 244 of hub 136 is closed by a plate or disk 246 received over the cylindrical portion 244 and threaded into cylindrical wall 202.

Mounted over neck or cylindrical portion 242 of the frusto-conical member 236 is a ratchet housing 248. Disposed on an exterior surface of housing 248 and radially disposed at generally equi-distance locations are pivot shafts 250, each receiving a ratchet member 252 in pivot relation thereon. Also disposed adjacent the exterior surface of housing 248 and generally in the same plane as ratchet members 252 is an inner cam member 254 mounted near one end of shaft 102. Cam member 254 includes three equidistant and radially located lobes 256, each joined with an adjacent lobe by an arcuate perimeter 258 such that as cam member 254 rotates in one direction with respect to ratchet housing 248, the curved perimeter 258 rotates the ratchets about their pivot axes 250. When rotated in an opposite direction, each lobe 256 includes a flat which engages a respective flat on one of the ratchet members 252 in an extended or normal position, thus transferring the respective force to the ratchet housing 248. Each of the ratchet members 252 rotate approximately 90 degrees in the first direction and do not rotate in the second direction, thus permitting the rotation of cam member in the one direction but not in the opposite direction.

In operation, the user sits on seat 26 extending from seat post 38, placing his or her feet on the respective pedals 148, 150 and gripping the handle bars 178 with the hands, much in the same manner as if one were to ride a bicycle. Manually turning the crank assembly 142 turns the chain 154, which, in turn, rotates drive sprocket 134 attached to hub 136. Sprocket 134 rotates quad-threaded internal shaft 216 in a direction moving jaw clutch member 208 out of engagement with mating jaw member 218 and urges tapered surface 210 into engagement with corresponding tapered surface 206 along inner wall 202, thus rotating hub 136 in a forward direction. As hub 136 rotates, so does drive pulley 130 which moves the track about wheels 104 and 108. Track or drive belt 122 then propels the tracked cycle along the terrain. Irregularities in the terrain are absorbed by front spring 180 arranged along shaft 170, while shocks/struts 112, 114 attached to wheel 104 absorb variations at the rear of cycle 10. When the operator wishes to stop the cycle, he or she reverses the pedaling direction as is done with conventional coaster brakes. Sprocket 134 rotates the quad-threaded internal shaft 216 causing jaw clutch member 208 into engagement with the mating jaw member 218 urging the mating jaw member 218 into wedging contact with arcuate brake segments 226. The interaction of the tapered surfaces of the frusto-conical member 236 and mating jaw member 218 with the arcuate brake segments 226 forces the brake segments outwardly into contact with the inner wall 202 of hub 136, producing friction and slowing the rate of rotation. Track or belt 122 may be reversed by continuing the counter-rotation of the crank assembly 142 which, in turn, counter-rotates sprocket 134. Counter-rotating motion is provided to the quad-thread internal shaft which, in turn, forces mating jaw member 218 and fixed frusto-conical member 236 into wedging relationship with arcuate brake segments 226. Brake segments 226, in turn, engage the inner wall 202 of hub 136 and force it to rotate in an opposite direction. In this case, the braking action produced by the fixed frusto-conical member 236 and the interaction of cam member 254 against ratchet member 252 is reversed, resulting in the curved or arcuate perimeter to ratchet or cam past the ratchet members 252.

Figure 2:
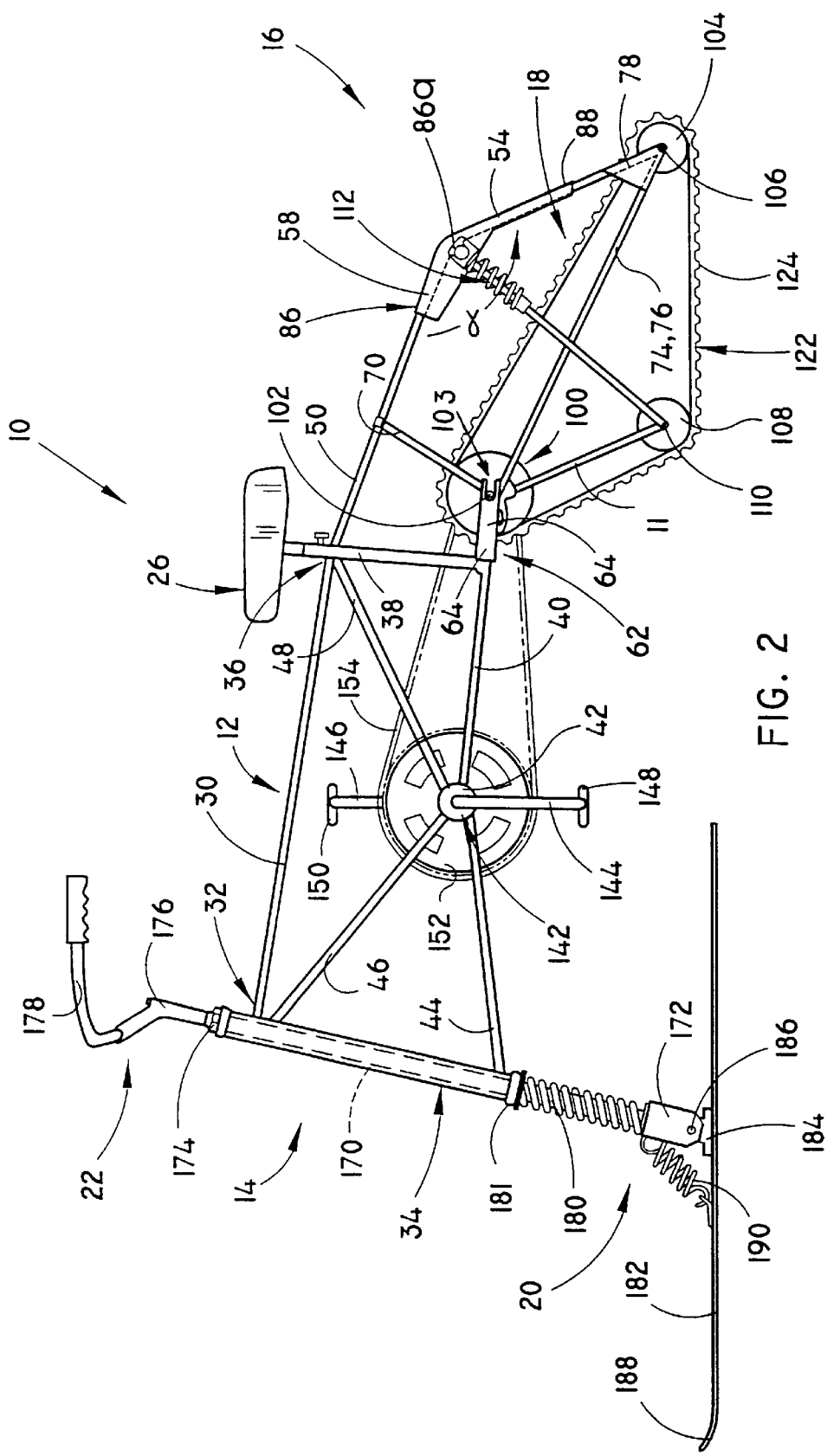
FIG. 2 is a side elevation view of the tracked cycle.
Figure 9:
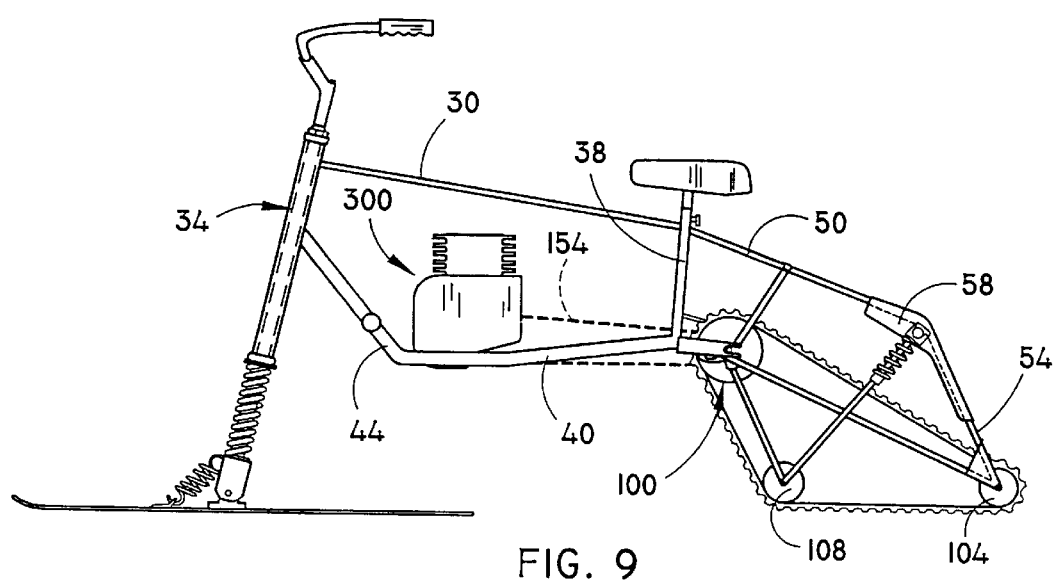
FIG. 9 is a side elevation view of another embodiment of the tracked cycle.

It is also contemplated that crank assembly 142 (as shown in FIG. 2), as well as drive sprocket 134, could incorporate sprockets of different sizes so that different gear ratios could be selected as required by the rider. Such gear assemblies are widely used on off-road bicycles and road bikes, and could easily be adapted for use on this vehicle. Although a manually powered tracked cycle is shown, crank assembly 142 and pedals 148, 150 may be replaced with an internal combustion engine 300 such as those used on motorcycles and shown generally in FIG. 9. Frame 12 could be modified to support and mount such an engine thereon. Moreover, the chain drive mechanism would be equally applied to such an engine.

Any one of the embodiments described herein could also be modified to utilize two tracks instead of the one. The rear of the frame could be modified such that a single drive gear or sprocket be connected by a single shaft to outboard drive wheels. This modification would result in a wider and more stable platform for the snow bike.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

What is claimed is:

1. A tracked cycle, comprising in combination:
   a frame assembly defining a front end and a rear end;
   a drive assembly mounted to said frame assembly, said drive assembly including a drive gear assembly mounted to said frame assembly, and a continuous track extending around said drive gear assembly;
   a steering post extending through a tube attached to said front end of said frame assembly;
   a handle bar assembly attached to an upper end of said steering post;
   a ski assembly attached to a lower end of said steering post such that movement of the handle bar assembly moves the ski assembly about a longitudinal axis of said steering post; and a means attached to said frame assembly for driving said drive gear assembly and moving said continuous track;

the drive gear assembly including a hub having an internal cavity defined therein and a brake assembly disposed within said internal cavity wherein said brake assembly includes a plurality of arcuate brake segments defining a ring about an inner wall of said hub and having tapered side walls, each of said arcuate brake segments having an outer wall for engaging said inner wall of said hub and an inner wall interconnected to said outer wall by a pair of tapered sidewalls, and a member disposed within said internal cavity having a frusto-conical end engaging said tapered sidewalls of each of said arcuate brake segments, and a cylindrical member from said hub and a ratchet assembly mounted to said cylindrical member extending from said hub for reversing a direction of rotation of said hub upon a reversal of said means attached to said frame assembly for driving said drive gear assembly and moving said track.

2. The tracked cycle as defined in claim 1, wherein said means attached to said frame assembly for driving said drive gear assembly and moving said track includes:

a crank shaft pivotally attached to a lower end of said frame assembly;

a first sprocket attached to said crank shaft;

a second sprocket attached to said drive gear assembly;

a drive chain extending between said first and second sprockets; and pedals and crank arms attached to said crank shaft.

3. The tracked cycle as defined in claim 1, wherein said ski assembly attached to said lower end of said steering post includes:

a ski having a tip and a tail;

a pivotal coupling interconnecting said ski to said lower end of said steering post; and a biasing member for elevating said tip with respect to said tail when said ski is not in contact with the ground.

4. A tracked cycle, comprising in combination:

a frame assembly defining a front end and a rear end;

a drive assembly mounted to said frame assembly, said drive assembly including a drive gear assembly mounted to said frame assembly, a first wheel mounted to said rear end of said frame assembly distant from said drive gear assembly, and a second wheel intermediate said drive gear assembly and said first wheel pivotally interconnected to said frame assembly by a shock absorber assembly depending from said frame assembly, and a continuous track extending around said drive gear assembly and said first and second wheels to generally define a triangle such that one side of the triangle defined by said continuous track extending between said first and second wheels is in contact with the ground, and another side of the triangle defined by a portion of the continuous track extending between said drive gear assembly and said second wheel is inclined toward said front end of said frame assembly;

a steering post extending through a tube attached to said front end of said frame assembly;

a handle bar assembly attached to an upper end of said steering post;

a ski assembly attached to a lower end of said steering post such that movement of the handle bar assembly moves the ski assembly about a longitudinal axis of said steering post; and a means attached to said frame assembly for driving said drive gear assembly and moving said continuous track;

the drive gear assembly including a hub having an internal cavity defined therein and a brake assembly disposed within said internal cavity wherein said brake assembly includes a plurality of arcuate brake segments defining a ring about an inner wall of said hub, each of said arcuate brake segments having an outer wall for engaging said inner wall of said hub and an inner wall interconnected to said outer wall by a pair of tapered sidewalls, and a member disposed within said internal cavity adjacent said plurality of arcuate brake segments having a frusto-conical end engaging one of said tapered sidewalls of each of said arcuate brake segments, and a cylindrical member having a portion extending outwardly said hub and having a ratchet assembly mounted to said portion of said cylindrical member for reversing a direction of rotation of said hub upon a reversal of said means attached to said frame assembly for driving said drive gear assembly and moving said track.

5. The tracked cycle as defined in claim 4, further including:

a swivel guide-arm assembly interconnecting said second wheel to said frame assembly; and at least one seat attached to said frame assembly configured to receive at least one rider thereon.

6. The tracked cycle as defined in claim 4, wherein said hub further includes:

an axle extending through said internal cavity along an axis of said hub;

a clutch member disposed at an end of said internal cavity along said axle and opposite said ratchet assembly and having a tapered external surface at one end for engaging an inwardly tapering wall portion of said internal cavity, and a jaw portion at an opposite end;

a shaft received along said axle and concentric through said clutch member for translating said clutch member between a first and second position along said axle; and a mating clutch member received along said axle within said internal cavity adjacent said clutch member and having one end for mating with said jaw end of the clutch member, and a second end having a tapered external surface.

7. A tracked cycle, comprising in combination:

a frame assembly defining a front end and a rear end;

a drive assembly mounted to said frame assembly, said drive assembly including a drive gear assembly mounted to said frame assembly, a first wheel mounted to said rear end of said frame assembly distant from said drive gear assembly, and a second wheel intermediate said drive gear assembly and said first wheel, and pivotally interconnected to said frame assembly by a shock absorber assembly depending from said frame assembly, and a continuous track extending around said drive gear assembly and said first and second wheels to generally define a triangle such that one side of the triangle is defined by said continuous track extending between said first and second wheels is in contact with the ground, and another side of the triangle defined by a portion of the continuous track extending between said drive gear assembly and said second wheel is inclined toward said front end of said frame assembly;

a steering post extending through a tube attached to said front end of said frame assembly;

a handle bar assembly attached to an upper end of said steering post;

a ski assembly attached to a lower end of said steering post such that movement of the handle bar assembly moves the ski assembly about a longitudinal axis of said steering post; and a means attached to said frame assembly for driving said drive gear assembly and moving said continuous track;

said drive assembly further including a hub having an internal cylindrical cavity, an axle extending through said internal cylindrical cavity along an axis of said hub, a clutch member disposed at one end of said internal cylindrical cavity along said axle and having a tapered external surface at one end for engaging an inwardly tapering wall portion of said internal cavity and a jaw portion at an opposite end, a shaft received along said axle and concentric through said clutch member for translating said clutch member between a first and second position along said axle, a mating clutch member received along said axle within said internal cylindrical cavity adjacent said clutch member and having one end for mating with said jaw end of the clutch member, and a second end having a tapered external surface, a plurality of arcuate brake segments disposed within said cylindrical internal cavity adjacent said mating clutch member to define a ring encircling said axle, each of said arcuate brake segments having an outer wall for engaging said internal cylindrical cavity of said hub, an inner wall interconnected to said outer wall by a pair of tapered sidewalls, a member disposed within said internal cavity along said axle adjacent said plurality of arcuate brake segments and having a frusto-conical end engaging one of said tapered sidewalls of each of said arcuate brake segments, a cylindrical member extending from an opposite end outwardly from said hub, and a ratchet assembly mounted to said cylindrical member for reversing a direction of rotation of said hub upon a reversal of said means attached to said frame assembly for driving said drive gear assembly and moving said track.

\* \* \* \* \*

UNITED STATES PATENT AND TRADEMARK OFFICE
CERTIFICATE OF CORRECTION

PATENT NO. : 6,164,670  
DATED : December 26, 2000  
INVENTOR(S) : Daniel Abarca et al.

Page 1 of 1

It is certified that error appears in the above-identified patent and that said Letters Patent is hereby corrected as shown below:

<u>Column 10, claim 4,</u>  
Line 14, after "outwardly" insert -- from --.

<u>Column 10, claim 6,</u>  
Lines 31-32, delete "opposite said ratchet assembly and".

Signed and Sealed this

Eighteenth Day of December, 2001

Attest:

JAMES E. ROGAN  
*Attesting Officer*   *Director of the United States Patent and Trademark Office*

UNITED STATES PATENT AND TRADEMARK OFFICE
CERTIFICATE OF CORRECTION

PATENT NO. : 6,164,670
DATED : December 26, 2000
INVENTOR(S) : Daniel Abarca et al.

It is certified that error appears in the above-identified patent and that said Letters Patent is hereby corrected as shown below:

Column 10,
Line 32, insert -- opposite said ratchet assembly and -- after "along said axle and".

Signed and Sealed this

Second Day of July, 2001

Attest:

Attesting Officer

JAMES E. ROGAN
Director of the United States Patent and Trademark Office